United States Patent
Sugiura

(10) Patent No.: US 10,704,593 B2
(45) Date of Patent: Jul. 7, 2020

(54) BEARING STRUCTURE AND TURBOCHARGER

(71) Applicant: IHI Corporation, Koto-ku (JP)

(72) Inventor: Tomomi Sugiura, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/283,297

(22) Filed: Feb. 22, 2019

(65) Prior Publication Data

US 2019/0186538 A1 Jun. 20, 2019

Related U.S. Application Data

(63) Continuation of application No. PCT/JP2017/032078, filed on Sep. 6, 2017.

(30) Foreign Application Priority Data

Sep. 29, 2016 (JP) .................. 2016-190813

(51) Int. Cl.
*F16C 17/10* (2006.01)
*F16C 33/10* (2006.01)
*F02B 39/00* (2006.01)

(52) U.S. Cl.
CPC ............ *F16C 17/107* (2013.01); *F02B 39/00* (2013.01); *F16C 33/1065* (2013.01); *F16C 2360/24* (2013.01)

(58) Field of Classification Search
CPC ........ F16C 17/04; F16C 17/10; F16C 17/107; F16C 17/18; F16C 33/1065
See application file for complete search history.

(56) References Cited

U.S. PATENT DOCUMENTS

| 6,017,184 A | 1/2000 | Aguilar et al. |
| 7,670,056 B2 | 3/2010 | Petitjean et al. |

(Continued)

FOREIGN PATENT DOCUMENTS

| CA | 2 301 151 A1 | 2/1999 |
| CN | 1273622 A | 11/2000 |

(Continued)

OTHER PUBLICATIONS

International Search Report dated Nov. 21, 2017 in International Application PCT/JP2017/032078 filed on Sep. 6, 2017 (with English Translation).

(Continued)

*Primary Examiner* — James Pilkington
(74) *Attorney, Agent, or Firm* — Oblon, McClelland, Maier & Neustadt, L.L.P.

(57) ABSTRACT

Provided is a bearing structure, including: a thrust bearing surface having a through hole for allowing a shaft to be inserted therethrough; a plurality of land portions, which are formed on the thrust bearing surface, and are separated apart from each other in a rotation direction of the shaft; a tapered portion, which is formed between the plurality of land portions on the thrust bearing surface, and has a projection height in an insertion direction of the shaft which becomes higher toward a forward side in the rotation direction; and a thrust groove, which is formed in the tapered portion, and extends from the through hole to a radially inner side of an outer peripheral end of the tapered portion.

7 Claims, 8 Drawing Sheets

(56) References Cited

U.S. PATENT DOCUMENTS

| | | | |
|---|---|---|---|
| 7,832,934 B2 * | 11/2010 | Hemmi | F16C 17/04 |
| | | | 384/121 |
| 2002/0181811 A1 | 12/2002 | Aguilar | |
| 2006/0165325 A1 | 7/2006 | Link et al. | |
| 2008/0232729 A1 | 9/2008 | Petitjean et al. | |
| 2010/0061668 A1 | 3/2010 | Petitjean et al. | |
| 2019/0153895 A1 * | 5/2019 | Sugiura | F16C 17/02 |

FOREIGN PATENT DOCUMENTS

| | | |
|---|---|---|
| CN | 1802515 A | 7/2006 |
| CN | 101672216 A | 3/2010 |
| EP | 1 312 769 A1 | 5/2003 |
| EP | 1 644 647 A1 | 4/2006 |
| EP | 2 163 731 A1 | 3/2010 |
| JP | 5-12635 | 2/1993 |
| JP | 8-189525 | 7/1996 |
| JP | 2001-512801 | 8/2001 |
| JP | 2003-148456 | 5/2003 |
| JP | 2007-23858 | 2/2007 |
| JP | 2007-506906 | 3/2007 |
| JP | 2008-95703 A | 4/2008 |
| JP | 2009-216036 | 9/2009 |
| JP | 2011-131289 | 7/2011 |
| JP | 2012-31979 | 2/2012 |
| JP | 2013-113412 | 6/2013 |
| JP | 2014-238009 | 12/2014 |
| JP | 2016-11714 | 1/2016 |
| WO | WO 99/07982 A1 | 2/1999 |
| WO | WO 02/099296 A1 | 12/2002 |
| WO | WO 2005/003577 A1 | 1/2005 |

OTHER PUBLICATIONS

Office Action dated Dec. 10, 2019 in corresponding Japanese Patent Application No. 2018-542057 (with English Translation), 8 pages.

* cited by examiner

BEARING STRUCTURE AND TURBOCHARGER

CROSS REFERENCE TO RELATED APPLICATIONS

This application is a continuation application of International Application No. PCT/JP2017/032078, filed on Sep. 6, 2017, which claims priority to Japanese Patent Application No. 2016-190813, filed on Sep. 29, 2016, the entire contents of which are incorporated by reference herein.

BACKGROUND ART

Technical Field

The present disclosure relates to a bearing structure having land portions and tapered portions on a thrust bearing surface, and to a turbocharger including the bearing structure.

Related Art

Hitherto, there has been known a turbocharger in which a shaft is axially supported so as to be rotatable in a bearing housing. A turbine impeller is provided at one end of the shaft, and a compressor impeller is provided at another end of the shaft. The turbocharger is connected to an engine. The turbine impeller is rotated by exhaust gas discharged from the engine. The rotation of the turbine impeller causes the compressor impeller to rotate through the shaft. The turbocharger compresses air along with the rotation of the compressor impeller and delivers the compressed air to the engine.

For example, in Patent Literature 1, there is disclosed a turbocharger in which a semi-floating bearing being one type of bearings is provided. A main body portion of the semi-floating bearing has a through hole for allowing a shaft to be inserted therethrough. Thrust bearing surfaces are formed on both end surfaces of the main body portion, respectively. The thrust bearing surface has tapered portions, land portions, and thrust grooves. A plurality of land portions are formed so as to be separated apart from each other in a rotation direction of the shaft. The tapered portions are each formed between the land portions. Moreover, in Patent Literature 1, the thrust grooves are each formed between the tapered portion and the land portion. The thrust grooves extend from the through hole to an outer peripheral end of the thrust bearing surface.

CITATION LIST

Patent Literature

Patent Literature 1: U.S. Pat. No. 7,670,056 B2

SUMMARY

Technical Problem

The thrust grooves described in Patent Literature 1 introduce lubricating oil, which has flowed into the thrust grooves from the through hole, to the tapered portions and the land portions. However, part of the lubricating oil having been introduced to the thrust grooves flows out from the thrust grooves to an outer periphery of the thrust bearing surface. As a result, depending on a rotation speed of the shaft, the lubricating oil to be supplied flows out directly to an outer peripheral side without being consumed on the thrust bearing surface. Therefore, bearing performance degrades.

An object of the present disclosure is to provide a bearing structure and a turbocharger, which are capable of improving bearing performance.

Solution to Problem

In order to solve the above-mentioned problem, according to one mode of the present disclosure, there is provided a bearing structure, including: a thrust bearing surface having a through hole for allowing a shaft to be inserted therethrough; a plurality of land portions, which are formed on the thrust bearing surface, and are separated apart from each other in a rotation direction of the shaft; a tapered portion, which is formed between the plurality of land portions on the thrust bearing surface, and has a projection height in an insertion direction of the shaft which becomes higher toward a forward side in the rotation direction; and a thrust groove, which is formed in the tapered portion, and extends from the through hole to a radially inner side of an outer peripheral end of the tapered portion.

The thrust groove may be located on a backward side in the rotation direction with respect to a width center of the tapered portion in the rotation direction.

A distance in the rotation direction between the land portion on the backward side in the rotation direction with respect to the tapered portion and the thrust groove may be smaller than a width of the thrust groove in the rotation direction.

The thrust groove may have a tapered shape toward a radially outer side.

The bearing structure may further includes: a radial bearing surface, which is formed on an inner peripheral surface of the through hole; and a radial groove, which is formed in the radial bearing surface so as to continue from the thrust groove, and has a width in the rotation direction smaller than a maximum width of the thrust groove in the rotation direction.

In order to solve the above-mentioned problem, according to one mode of the present disclosure, there is provided a turbocharger, including the above-mentioned bearing structure.

Effects of Disclosure

According to the present disclosure, it is possible to improve bearing performance.

DESCRIPTION OF EMBODIMENT

Figure 1:
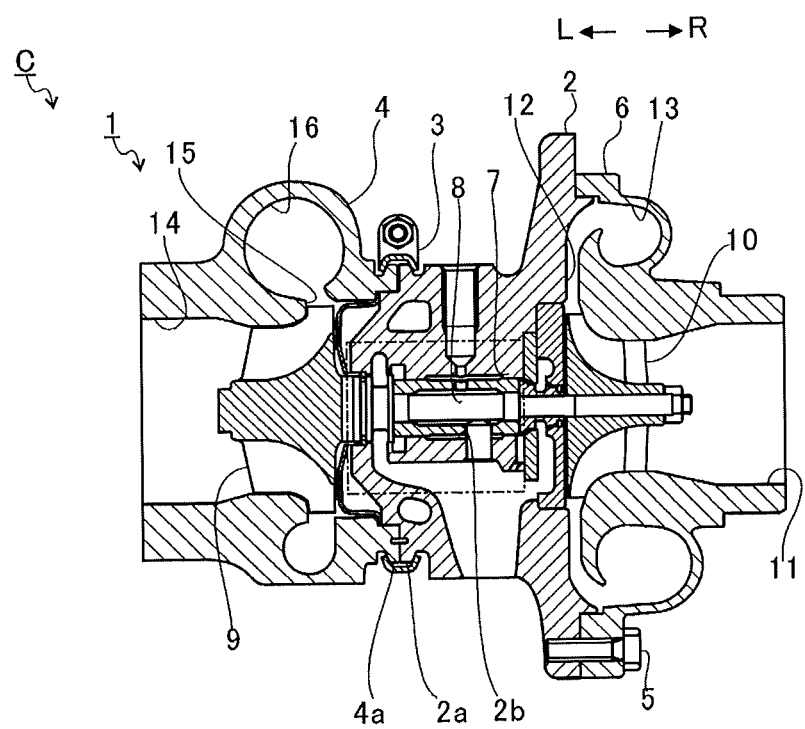
FIG. 1 is a schematic sectional view of a turbocharger.

Now, with reference to the attached drawings, one embodiment of a bearing structure and a turbocharger is described in detail. The dimensions, materials, and other specific numerical values represented in the embodiment are merely examples used for facilitating the understanding of the disclosure, and do not limit the configurations otherwise particularly noted. Elements having substantially the same functions and configurations herein and in the drawings are denoted by the same reference symbols to omit redundant description thereof.

FIG. 1 is a schematic sectional view of a turbocharger C. In the following description, the direction indicated by the arrow L illustrated in FIG. 1 corresponds to a left side of the turbocharger C, and the direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 2. A turbine housing 4 is coupled to the left side of the bearing housing 2 by a fastening mechanism 3. A compressor housing 6 is coupled to the right side of the bearing housing 2 by a fastening bolt 5. The bearing housing 2, the turbine housing 4, and the compressor housing 6 are integrally formed.

On an outer peripheral surface of the bearing housing 2, there is formed a projection 2a. The projection 2a is formed in a vicinity of the turbine housing 4. The projection 2a projects in a radial direction of the bearing housing 2. Moreover, on an outer peripheral surface of the turbine housing 4, there is formed a projection 4a. The projection 4a is formed in a vicinity of the bearing housing 2. The projection 4a projects in a radial direction of the turbine housing 4. The bearing housing 2 and the turbine housing 4 are mounted to each other by band-fastening the projections 2a and 4a with the fastening mechanism 3. The fastening mechanism 3 is constructed by, for example, a G-coupling for clamping the projections 2a and 4a.

The bearing housing 2 has a bearing hole 2b. The bearing hole 2b penetrates in a right-and-left direction of the turbocharger C. A semi-floating bearing 7 is provided in the bearing hole 2b. A shaft 8 is axially supported by the semi-floating bearing 7 so as to be rotatable.

A turbine impeller 9 is provided to a left end portion of the shaft 8. The turbine impeller 9 is received in the turbine housing 4 so as to be rotatable. Moreover, a compressor impeller 10 is provided to a right end portion of the shaft 8. The compressor impeller 10 is received in the compressor housing 6 so as to be rotatable.

The compressor housing 6 has a suction port 11. The suction port 11 is opened on the right side of the turbocharger C. The suction port 11 is connected to an air cleaner (not shown). A diffuser flow passage 12 is defined by opposed surfaces of the bearing housing 2 and the compressor housing 6. In the diffuser flow passage 12, the air is increased in pressure. The diffuser flow passage 12 has an annular shape which extends from a radially inner side to an outer side of the shaft 8. Moreover, the diffuser flow passage 12 communicates with the suction port 11 on the radially inner side through intermediation of the compressor impeller 10.

Moreover, the compressor housing 6 has a compressor scroll flow passage 13. The compressor scroll flow passage 13 has an annular shape. The compressor scroll flow passage 13 is located, for example, on the radially outer side of the shaft 8 with respect to the diffuser flow passage 12. The compressor scroll flow passage 13 communicates with a suction port of an engine (not shown). The compressor scroll flow passage 13 communicates also with the diffuser flow passage 12. Thus, when the compressor impeller 10 is rotated, air is sucked into the compressor housing 6 through the suction port 11. The sucked air is increased in speed by an action of a centrifugal force during a course of flowing through blades of the compressor impeller 10. The air having been increased in speed is increased in pressure in the diffuser flow passage 12 and the compressor scroll flow passage 13. The air having been increased in pressure is introduced to the suction port of the engine.

The turbine housing 4 has a discharge port 14. The discharge port 14 is opened on the left side of the turbocharger C. The discharge port 14 is connected to an exhaust gas purification device (not shown). Moreover, a flow passage 15 is formed in the turbine housing 4. A turbine scroll flow passage 16 is formed in the turbine housing 4. The turbine scroll flow passage 16 has an annular shape. The turbine scroll flow passage 16 is located, for example, on the radially outer side of the turbine impeller 9 with respect to the flow passage 15. The turbine scroll flow passage 16 communicates with a gas inflow port (not shown). The exhaust gas discharged from an exhaust gas manifold of the engine (not shown) is introduced to the gas inflow port. The turbine scroll flow passage 16 communicates also with the flow passage 15. Thus, the exhaust gas introduced through the gas inflow port to the turbine scroll flow passage 16 is introduced to the discharge port 14 through the flow passage 15 and the turbine impeller 9. The exhaust gas to be introduced to the discharge port 14 causes the turbine impeller 9 to rotate during a course of flowing.

Then, a rotational force of the turbine impeller 9 is transmitted to the compressor impeller 10 through the shaft 8. When the compressor impeller 10 is rotated, as described above, air is increased in pressure. In such a manner, the air is introduced to the suction port of the engine.

Figure 2:
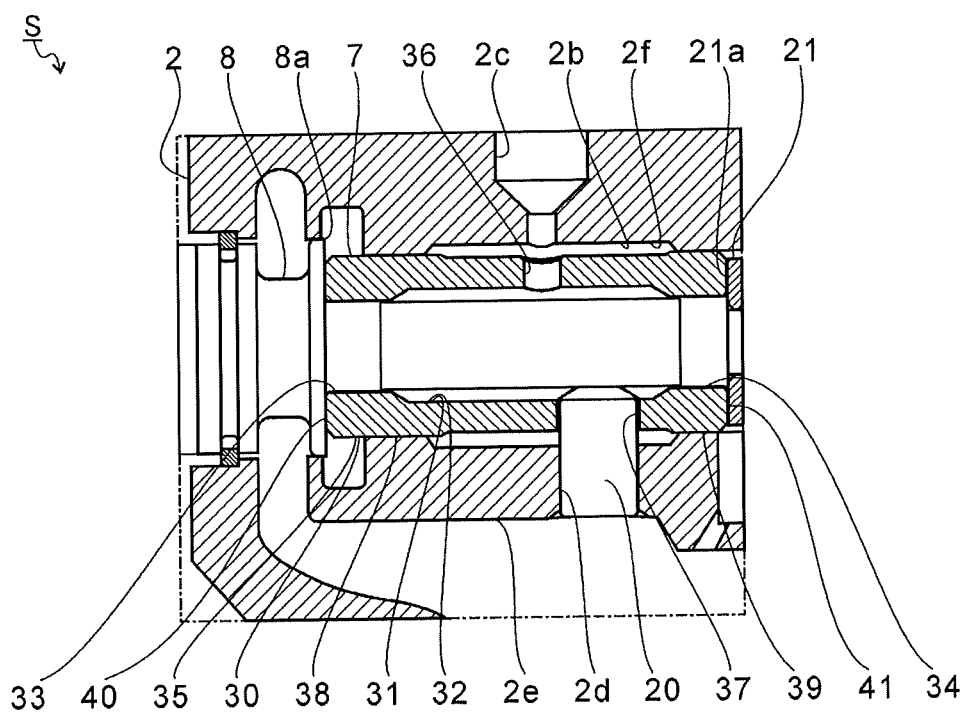
FIG. 2 is an extracted view of the one-dot chain line portion of FIG. 1.

FIG. 2 is an extracted view of the one-dot chain line portion of FIG. 1. As illustrated in FIG. 2, a bearing structure S is provided inside the bearing housing 2. In the bearing structure S, an oil passage 2c is formed in the bearing housing 2. The lubricating oil flows into the bearing hole 2b from the oil passage 2c. The semi-floating bearing 7 is arranged in the bearing hole 2b. A through hole 31 is formed in a main body portion 30 of the semi-floating bearing 7. The through hole 31 passes through the main body portion 30 in an axial direction of the shaft 8 (hereinafter simply referred to as "axial direction"). The shaft 8 is inserted through the through hole 31. A radial bearing surface 33 is formed on the turbine impeller 9 side of an inner peripheral surface 32 of the through hole 31. A radial bearing surface 34 is formed on the compressor impeller 10 side of the inner peripheral surface 32 of the through hole 31. Two of the radial bearing surfaces 33 and 34 are separated apart from each other in the axial direction of the shaft 8.

An oil hole 36 is opened between two of the radial bearing surfaces 33 and 34 in the main body portion 30. The oil hole 36 passes through the main body portion 30 from the inner peripheral surface 32 to an outer peripheral surface 35. Part of the lubricating oil supplied to the bearing hole 2b passes through the oil hole 36 and flows into the through hole 31 of the main body portion 30. The lubricating oil having flowed into the through hole 31 spreads from the oil hole 36 to the turbine impeller 9 side and the compressor impeller 10 side. Then, the lubricating oil is supplied to a clearance between the shaft 8 and each of the radial bearing surfaces 33 and 34. The shaft 8 is axially supported by an oil film pressure of the lubricating oil having been supplied to the clearance between the shaft 8 and each of the radial bearing surfaces 33 and 34.

Moreover, the main body portion 30 has a positioning hole 37. The positioning hole 37 passes through the main body portion 30 from the inner peripheral surface 32 to the outer peripheral surface 35. The bearing housing 2 has a pin hole 2d. The pin hole 2d passes through a wall portion 2e of the bearing housing 2 on the lower side in FIG. 2, which has the bearing hole 2b. The pin hole 2d is opposed to the positioning hole 37. A positioning pin 20 is press-fitted to the pin hole 2d from the lower side in FIG. 2. A distal end of the positioning pin 20 is inserted into the positioning hole 37. In such a manner, rotation and axial movement of the semi-floating bearing 7 are regulated.

Moreover, two of damper portions 38 and 39 are formed on an outer peripheral surface of the main body portion 30. The damper portion 38 is formed on the left side in FIG. 2 (turbine impeller 9 side) in the main body portion 30. The damper portion 39 is formed on the right side in FIG. 2 (compressor impeller 10 side) in the main body portion 30. Two of the damper portions 38 and 39 are separated apart from each other in the axial direction. The lubricating oil is supplied from the oil passage 2c to a clearance between each of the damper portions 38 and 39 and an inner peripheral surface 2f of the bearing hole 2b. Vibration of the shaft 8 is suppressed by the oil film pressure of the lubricating oil.

Moreover, an oil thrower member 21 is provided to the shaft 8. The oil thrower member 21 is an annular member. The oil thrower member 21 is arranged on the right side in FIG. 2 (compressor impeller 10 side) with respect to the main body portion 30. An opposed surface 21a of the oil thrower member 21 is opposed to the main body portion 30 in the axial direction. An outer diameter of the opposed surface 21a is larger than, for example, an inner diameter of the radial bearing surface 34. The outer diameter of the opposed surface 21a is smaller than, for example, an outer diameter of the main body portion 30.

Part of the lubricating oil flows from the semi-floating bearing 7 to the compressor impeller 10 side. The oil thrower member 21 diffuses the lubricating oil to the radially outer side. In such a manner, the oil thrower member 21 suppresses leakage of the lubricating oil to the compressor impeller 10 side.

The shaft 8 has a large-diameter portion 8a. The large-diameter portion 8a is located on the left side in FIG. 2 (turbine impeller 9 side) with respect to the main body portion 30. The large-diameter portion 8a is opposed to the main body portion 30 in the axial direction. An outer diameter of the large-diameter portion 8a is larger than, for example, an inner diameter of the radial bearing surface 33 of the main body portion 30. The outer diameter of the large-diameter portion 8a is larger than, for example, the outer diameter of the main body portion 30.

The main body portion 30 is sandwiched between the oil thrower member 21 and the large-diameter portion 8a in the axial direction. A length of the main body portion 30 in the axial direction is slightly smaller than a distance between the large-diameter portion 8a and the oil thrower member 21. The shaft 8 is slightly movable in the axial direction. The lubricating oil is supplied to a clearance between the main body portion 30 and the oil thrower member 21 and a clearance between the main body portion 30 and the large-diameter portion 8a. When the shaft 8 moves in the axial direction, a load in the axial direction is supported by an oil film pressure between the oil thrower member 21 or the large-diameter portion 8a and the main body portion 30.

That is, an end surface of the main body portion 30 on the turbine impeller 9 side has a thrust bearing surface 40. An end surface of the main body portion 30 on the compressor impeller 10 side has a thrust bearing surface 41. Two of the thrust bearing surfaces 40 and 41 receive a thrust load.

Figure 3:
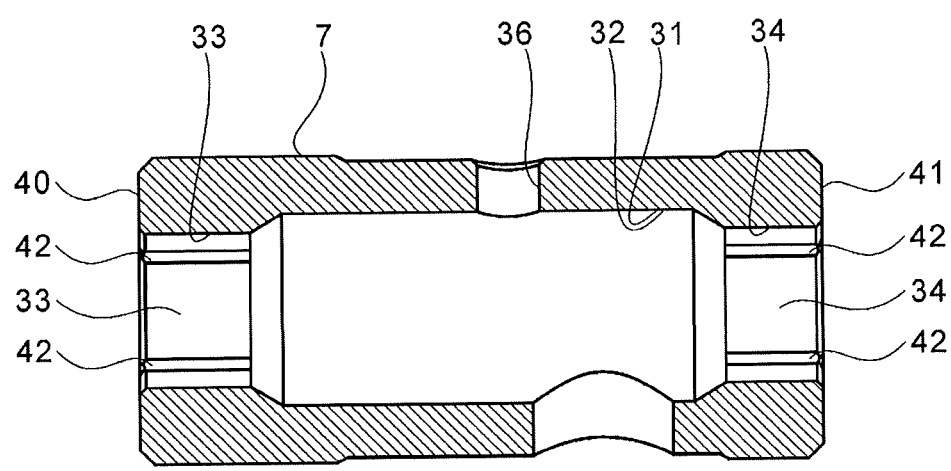
FIG. 3 is an extracted view of a semi-floating bearing of FIG. 2.

FIG. 3 is an extracted view of the semi-floating bearing 7 of FIG. 2. The radial bearing surfaces 33 and 34 each have radial grooves 42 along the axial direction. A plurality of (for example, four) radial grooves 42 are formed in each of the radial bearing surfaces 33 and 34 so as to be separated apart from each other in a rotation direction of the shaft 8 (that is, a circumferential direction of the inner peripheral surface 32 of the through hole 31, and hereinafter simply referred to as "rotation direction"). Part of the lubricating oil having flowed into the through hole 31 from the oil hole 36 flows into the radial grooves 42. Part of the lubricating oil having flowed into the radial grooves 42 is supplied to the radial bearing surfaces 33 and 34 along with rotation of the shaft 8. Part of the lubricating oil having flowed into the radial grooves 42 is supplied to the thrust bearing surfaces 40 and 41.

Figure 4A:
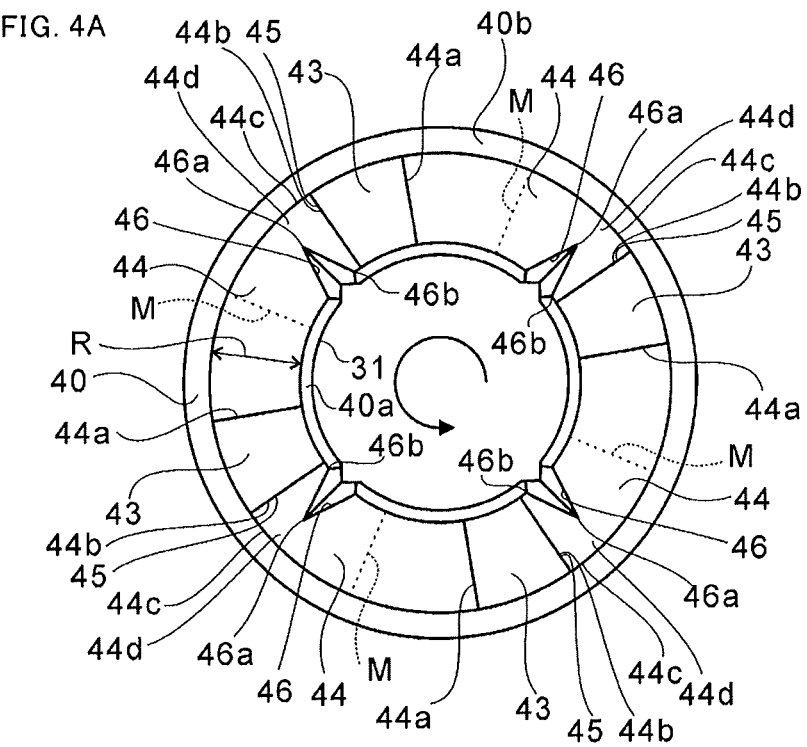
FIG. 4A is a view for illustrating a thrust bearing surface.
Figure 4B:
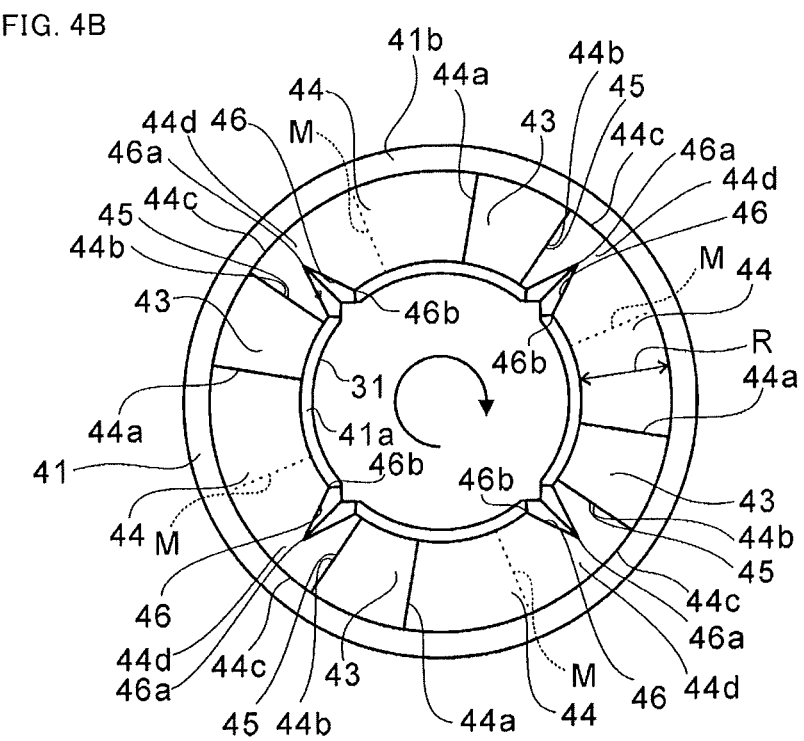
FIG. 4B is a view for illustrating a thrust bearing surface.

FIG. 4A is a view for illustrating the thrust bearing surface 40. FIG. 4B is a view for illustrating the thrust bearing surface 41. In FIG. 4A and FIG. 4B, the rotation direction is indicated by the arrow. The through hole 31 is opened in each of the thrust bearing surfaces 40 and 41. The thrust bearing surface 40 has a chamfered portion 40a at a boundary with respect to the through hole 31, and the thrust bearing surface 41 has a chamfered portion 41a at a boundary with respect to the through hole 31. The thrust bearing surface 40 has a chamfered portion 40b on an outer peripheral side thereof, and the thrust bearing surface 41 has a chamfered portion 41b on an outer peripheral side thereof.

The thrust bearing surfaces 40 and 41 each have land portions 43 and tapered portions 44. The land portion 43 is a surface perpendicular to a center axis of the main body portion 30. A plurality of (for example, four) land portions 43 are formed so as to be separated apart from each other in the rotation direction. One tapered portion 44 is formed between two land portions 43 adjacent to each other in the rotation direction. The land portions 43 are formed so as to correspond to the tapered portions 44, and are located on the backward side of the tapered portions 44 in the rotation direction as described below.

The tapered portion 44 is an inclined surface. In the tapered portion 44, a projection height in an insertion direction of the shaft 8 (hereinafter simply referred to as "projection height") becomes higher toward a forward side in the rotation direction. For example, in FIG. 4A, the tapered portion 44 projects higher toward the near side in the drawing sheet (in a direction of approaching the large-diameter portion 8a) on the forward side in the rotation direction. An end portion 44a of the tapered portion 44 on the forward side in the rotation direction is flush with the land portion 43. Moreover, in FIG. 4A, the tapered portion 44 becomes lower toward the far side in the drawing sheet (in a direction of separating from the large-diameter portion 8a) on a backward side in the rotation direction. An end portion 44b of the tapered portion 44 on the backward side in the rotation direction is lower than the land portion 43. A boundary between the end portion 44b of the tapered portion 44 and the land portion 43 has a step surface 45.

The tapered portions 44 each have a thrust groove 46. The thrust groove 46 is formed on the radially outer side of the through hole 31. The thrust groove 46 extends to a radially inner side of an outer peripheral end 44c of the tapered portion 44. That is, in the tapered portion 44, an inclined surface 44d having no thrust groove 46 is left. The inclined surface 44d is formed between the outer peripheral end 44c (boundary between the tapered portion 44 and the chamfered portion 40b, 41b) and the thrust groove 46.

An outer peripheral end 46a of the thrust groove 46 is located in the vicinity of a center of the tapered portion 44 in the radial direction. However, the outer peripheral end 46a may be located on an inner side with respect to the center of the tapered portion 44 in the radial direction. Moreover, the outer peripheral end 46a may be located on an outer side with respect to the center of the tapered portion 44 in the radial direction. Moreover, when a length R is given as a length of the tapered portion 44 in the radial direction, the outer peripheral end 46a of the thrust groove 46 may be located within a range of from ⅓R to ⅔R from an inner peripheral end 46b of the thrust groove 46. In this case, as described below, the amount of lubricating oil to be supplied to the tapered portions 44 of the thrust bearing surfaces 40 and 41 effectively increases. Imbalance in load-bearing performance is suppressed, and hence bearing performance improves.

The thrust groove 46 becomes shallower toward the outer peripheral end 46a. The outer peripheral end 46a is flush with the inclined surface 44d of the tapered portion 44 having no thrust groove 46. That is, the thrust groove 46 continues to the inclined surface 44d at the outer peripheral end 46a.

In this case, a step between the tapered portion 44 and the thrust groove 46 is small. A change in flow direction of the lubricating oil flowing out from the thrust groove 46 to the inclined surface 44d becomes smaller. A change in pressure of the lubricating oil is suppressed. Moreover, for example, cavitation is less liable to occur in the lubricating oil flowing out from the thrust groove 46. A flow of the lubricating oil flowing out from the thrust groove 46 is less liable to be disturbed. However, a step which is parallel to the axial direction may be formed at the boundary between the thrust groove 46 and the inclined surface 44d.

The thrust groove 46 is located on the backward side of the tapered portion 44 in the rotation direction. That is, the thrust groove 46 is located on the backward side in the rotation direction with respect to a width center M of the tapered portion 44 in the rotation direction.

Figure 5A:
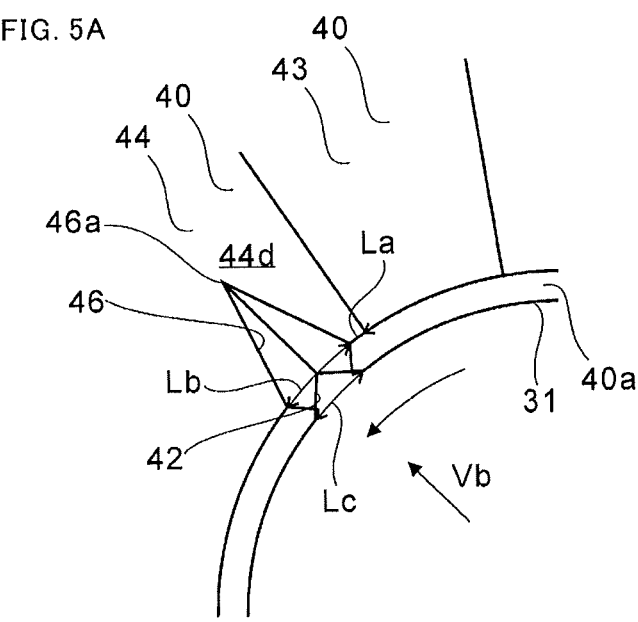
FIG. 5A is an extracted view for illustrating a part around a thrust groove of FIG. 4A.
Figure 5B:
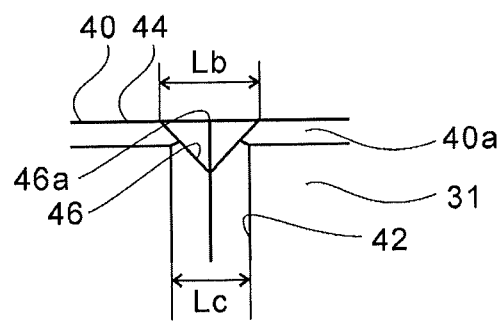
FIG. 5B is a view for illustrating the semi-floating bearing of FIG. 5A as seen in the direction indicated by the arrow Vb.

FIG. 5A is an extracted view for illustrating a part around the thrust groove 46 of FIG. 4A. FIG. 5B is a view for illustrating the semi-floating bearing 7 of FIG. 5A as seen in the direction indicated by the arrow Vb. In the following, in order to avoid redundant description, components which are provided to both of the thrust bearing surfaces 40 and 41 are described, in some parts, with the thrust bearing surface 40 as an example.

As illustrated in FIG. 5A, the thrust groove 46 is separated apart from the land portion 43 on the backward side in the rotation direction. Both the forward side and the backward side of the thrust groove 46 in the rotation direction are located in the inclined surface 44d of the tapered portion 44. As described above, the tapered portion 44 has a projection height lower than that of the land portion 43. Therefore, even when an edge is formed in the thrust groove 46, the edge is less liable to be brought into contact with the large-diameter portion 8a or the oil thrower member 21. However, when the edge of the thrust groove 46 can be set sufficiently small, the thrust groove 46 may be adjacent to the land portion 43 on the backward side in the rotation direction.

A width of the thrust groove 46 in the rotation direction is, for example, a maximum width Lb of the thrust groove 46 in the rotation direction. A separation distance between the thrust groove 46 and the land portion 43 on the backward side in the rotation direction may be set within a range of from ⅕Lb to ⅓Lb with respect to the maximum width Lb. In this case, as compared to the case in which the thrust groove 46 is formed adjacently (continuously) to the land portion 43, interference (disturbance) between the lubricating oil supplied to the thrust groove 46 and the lubricating oil supplied to the land portion 43 along with the rotation of the shaft 8 is prevented.

A distance La in the rotation direction between the thrust groove 46 and the land portion 43 on the backward side in the rotation direction with respect to the tapered portion 44 is smaller than the width of the thrust groove 46 in the rotation direction. The width of the thrust groove 46 in the rotation direction takes a maximum value, for example, on the outer peripheral end of the chamfered portion 40a. The thrust groove 46 is tapered toward the outer peripheral end 46a.

As illustrated in FIG. 5B, the thrust groove 46 is deepest at a width center (central portion) thereof in the rotation direction. The thrust groove 46 becomes shallower toward both end sides in the rotation direction. The thrust groove 46 has a substantially triangular shape as seen from the radially inner side. As illustrated in FIG. 5A, the radial groove 42 is deepest at a width center thereof in the rotation direction. The radial groove 42 becomes shallower toward both end sides in the rotation direction. The radial groove 42 has a substantially triangular shape as seen in the axial direction. That is, the thrust groove 46 and the radial groove 42 are smaller in width in the rotation direction at a deeper position (on the radially outer side).

The thrust groove 46 extends to the chamfered portion 40a in the axial direction and is opened at the chamfered portion 40a. The radial groove 42 extends radially inward to the chamfered portion 40a. The thrust groove 46 and the radial groove 42 continue (communicate) at the chamfered portion 40a. A width Lc of the radial groove 42 in the rotation direction is smaller than the maximum width Lb of the thrust groove 46 in the rotation direction. The width Lc of the radial groove 42 is, for example, a width of a portion continuing to the thrust groove 46.

The lubricating oil flows into the thrust groove 46 from the radial groove 42. The lubricating oil having flowed into the thrust groove 46 flows out from the thrust groove 46 along with the rotation of the shaft 8. The lubricating oil is supplied to the inclined surface 44d of the tapered portion 44 having no thrust groove 46. Then, the lubricating oil is supplied to the land portion 43 along with the rotation of the shaft 8.

The thrust groove 46 extends only to the radially inner side of the tapered portion 44 with respect to the outer peripheral end 44c of the tapered portion 44 from the through hole 31. Therefore, as compared to the case in which the thrust groove 46 is formed to the outer peripheral end 44c of the tapered portion 44, the amount of lubricating oil flowing out from the thrust bearing surface 40, 41 by the centrifugal force of the shaft 8 without flowing through the tapered portion 44 (without being consumed at the thrust bearing surface 40, 41) is suppressed. Then, the amount of lubricating oil to be supplied to the inner peripheral side of the thrust bearing surface 40, 41 increases. As a result, the amount of lubricating oil to be supplied to the tapered portion 44 of the thrust bearing surface 40, 41 increases. The imbalance in load-bearing performance is suppressed. The bearing performance improves.

Moreover, as described above, the thrust groove 46 is formed in the tapered portion 44. The tapered portion 44 has a projection height in the insertion direction of the shaft 8 lower than that of the land portion 43. Therefore, as compared to the case in which the thrust groove is formed outside the tapered portion 44 (for example, in the land portion 43 or between the land portion 43 and the tapered portion 44), the following advantages can be obtained. That is, in the thrust bearing surface 40, 41, the step between the inclined surface 44d having no thrust groove 46 and the thrust groove 46 becomes smaller. As a result, a change in flow direction of the lubricating oil becomes smaller. A change in pressure of the lubricating oil is suppressed. Moreover, for example, cavitation is less liable to occur in the lubricating oil flowing out from the thrust groove 46. A flow of the lubricating oil flowing out from the thrust groove 46 is less liable to be disturbed.

Figure 6A:
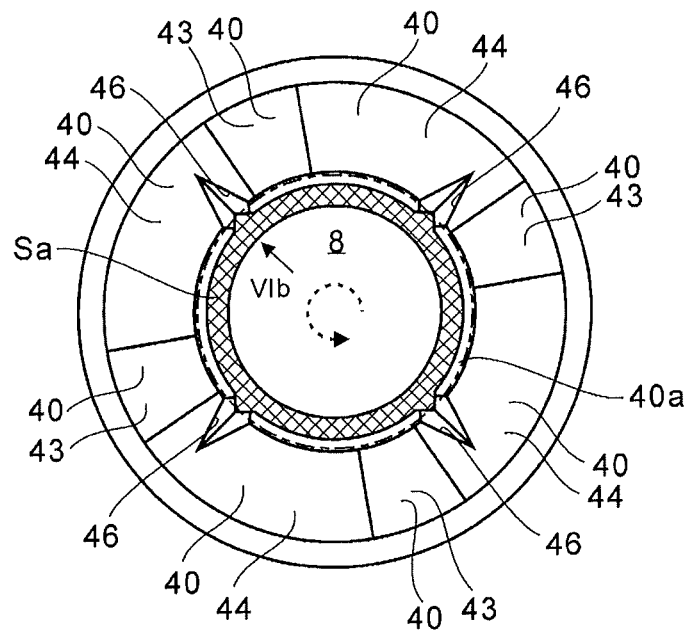
FIG. 6A is a view for illustrating a shaft and the thrust bearing surface.
Figure 6B:
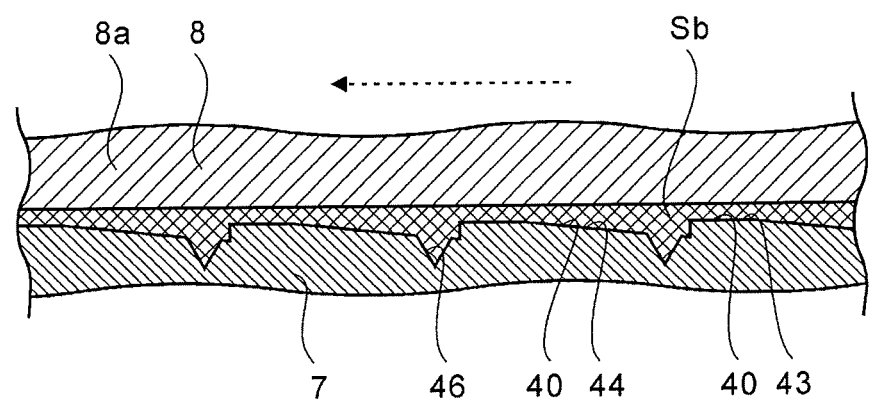
FIG. 6B is a view for illustrating a cross section of the one-dot chain line portion of FIG. 6A at the semi-floating bearing and the shaft (large-diameter portion) as seen in the direction indicated by the arrow VIb.

FIG. 6A is a view for illustrating the shaft 8 and the thrust bearing surface 40. FIG. 6B is a view for illustrating a cross section of the one-dot chain line portion of FIG. 6A at the semi-floating bearing 7 and the shaft 8 (large-diameter portion 8a) as seen in the direction indicated by the arrow VIb. In FIG. 6B, part of a cross section of the cylindrical portion at the one-dot chain line portion of FIG. 6A is developed into a plan view and extracted. In this case, in FIG. 6A, the one-dot chain line indicating the cross-section position of FIG. 6B is illustrated slightly on an inner peripheral side from the outer peripheral end of the chamfered portion 40a. However, in actuality, the cross-section position of FIG. 6B is located on the outer peripheral end of the chamfered portion 40a. In FIG. 6A and FIG. 6B, the rotation direction is indicated by the broken-line arrow. In FIG. 6A, a bearing clearance Sa (indicated by cross-hatching) defined between the shaft 8 and the radial bearing surface 33 is illustrated larger than actuality. In FIG. 6B, illustration is given with the cross section of the cylindrical shape being developed into a plan view. In FIG. 6B, a bearing clearance Sb (indicated by cross-hatching) defined between the shaft 8 (large-diameter portion 8a) and the thrust bearing surface 40 is illustrated larger than actuality. In FIG. 6B, inclination of the tapered portion 44 is illustrated larger than actuality. In FIG. 6B, the thrust groove 46 is illustrated larger than actuality.

As described above, the shaft 8 is slightly movable in the axial direction. Along with the movement of the shaft 8 in the axial direction, the bearing clearance Sb of each of two of the thrust bearing surfaces 40 and 41 expands or contracts. Herein, a state in which the bearing clearances Sb of two of the thrust bearing surfaces 40 and 41 are equal to each other is referred to as "nominal".

Now, flow-passage sectional areas of two of the bearing clearances Sa and Sb are compared. A flow-passage sectional area of the bearing clearance Sa of the radial bearing surface 33 is of a cross section perpendicular to the axial direction. A flow-passage sectional area of the bearing clearance Sb of the thrust bearing surface 40 is of a cross section taken along a cylindrical surface parallel to the axial direction passing through the outer peripheral end of the chamfered portion 40a at the time of being nominal. The flow-passage sectional area of the bearing clearance Sb may be set larger than the flow-passage sectional area of the bearing clearance Sa. In this case, the lubricating oil is more likely to flow from the bearing clearance Sa of the radial bearing surface 33 to the bearing clearance Sb of the thrust bearing surface 40.

Figure 7A:
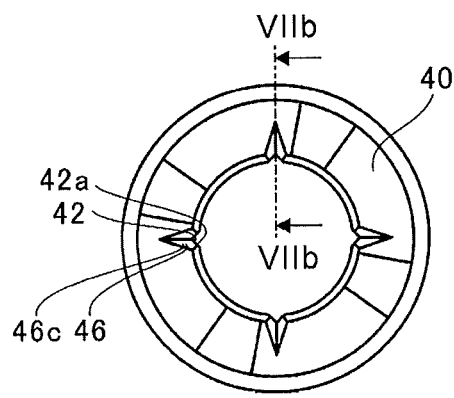
FIG. 7A is a view for illustrating the thrust bearing surface.
Figure 7B:
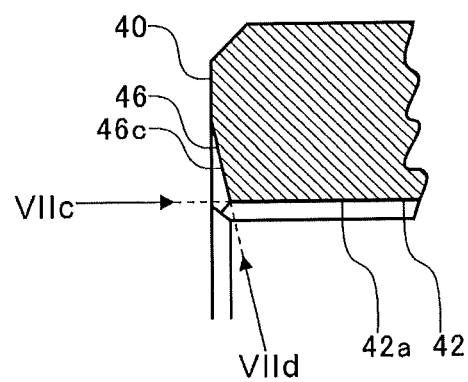
FIG. 7B is a sectional view taken along the line VIIb-VIIb of FIG. 7A.
Figure 7C:
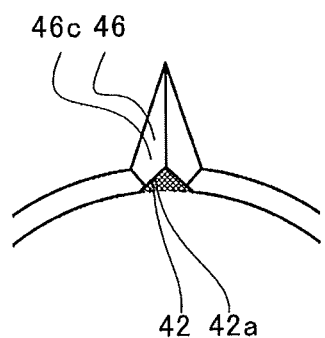
FIG. 7C is a view as seen in the direction indicated by the arrow VIIc of FIG. 7B.
Figure 7D:
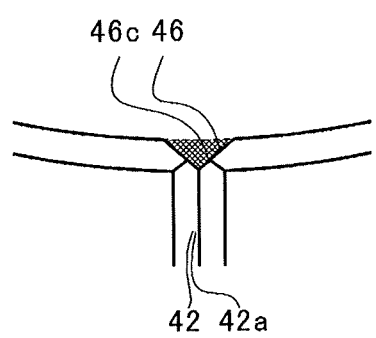
FIG. 7D is a view as seen in the direction indicated by the arrow VIId of FIG. 7B.

FIG. 7A is a view for illustrating the thrust bearing surface 40. FIG. 7B is a sectional view taken along the line VIIb-VIIb of FIG. 7A. FIG. 7C is a view as seen in the direction indicated by the arrow VIIc of FIG. 7B. FIG. 7D is a view as seen in the direction indicated by the arrow VIId of FIG. 7B. In FIG. 7B, FIG. 7C, and FIG. 7D, a part around the radial groove 42 and the thrust groove 46 is extracted and illustrated.

FIG. 7C is a view for illustrating the portion connecting the radial groove 42 and the thrust groove 46 to each other as seen in the axial direction. That is, FIG. 7C is a view for illustrating the portion connecting the radial groove 42 and the thrust groove 46 to each other as seen along an extension line of an inner wall surface 42a of the radial groove 42. FIG. 7D is a view for illustrating the portion connecting the radial groove 42 and the thrust groove 46 to each other as seen along an extension line of an inner wall surface 46c of the thrust groove 46.

In FIG. 7C, the radial groove 42 is indicated by cross-hatching. In FIG. 7D, the thrust groove 46 is indicated by cross-hatching. Positions of the radial groove 42 and the thrust groove 46 in the circumferential direction are the same. In this case, as compared to a case in which positions of the radial groove 42 and the thrust groove 46 in the circumferential direction are different from each other, the lubricating oil is more likely to be smoothly supplied from the radial groove 42 to the thrust groove 46. The term "same" is not strict, and encompasses dimensional tolerance at the time of manufacture. Moreover, a sectional area of the radial groove 42 may fall within a range of from 90% to 110% with respect to a sectional area of the thrust groove 46. The sectional area of the radial groove 42 is a sectional area perpendicular to the axial direction. The sectional area of the radial groove 42 is an area obtained by projecting the radial groove 42 on a plane perpendicular to the axial direction. The sectional area of the thrust groove 46 is a sectional area at a position with the maximum sectional area (radial groove 42 side) among sectional areas perpendicular to the inner wall surface 46c of the thrust groove 46. The sectional area of the thrust groove 46 is an area obtained by projecting the thrust groove 46 on a plane perpendicular to an extension line of the inner wall surface 46c.

When the sectional area of the radial groove 42 falls within a range of from 90% to 110% with respect to the sectional area of the thrust groove 46, the following effect is attained. That is, when the thrust groove 46 is excessively large with respect to the radial groove 42, there is a fear in that a sufficient load reaction force (oil film pressure) with respect to the thrust load cannot be obtained. When the thrust groove 46 is excessively small with respect to the radial groove 42, mechanical loss due to oil clogging may occur. When the sectional area of the radial groove 42 falls within the range of from 90% to 110% with respect to the sectional area of the thrust groove 46, a sufficient load reaction force with respect to the thrust load can be obtained. Moreover, when the sectional area of the radial groove 42 falls within the range of from 90% to 110% with respect to the sectional area of the thrust groove 46, increase in mechanical loss may be reduced.

Figure 8A:
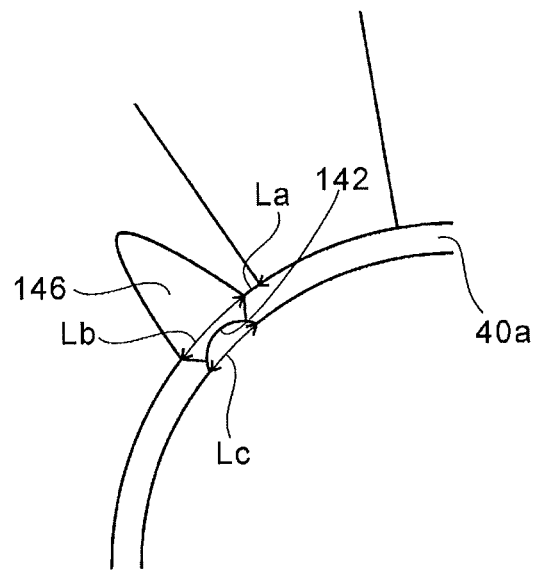
FIG. 8A is a view for illustrating a part corresponding to FIG. 5A in a first modification example.
Figure 8B:
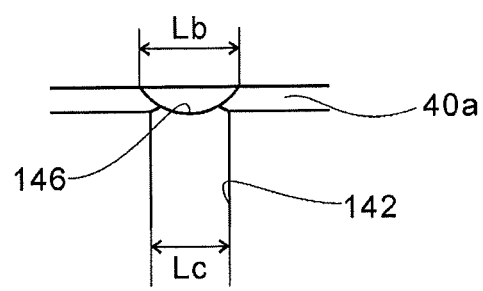
FIG. 8B is a view for illustrating a part corresponding to FIG. 5B in the first modification example.

FIG. 8A is a view for illustrating a part corresponding to FIG. 5A in a first modification example. FIG. 8B is a view for illustrating a part corresponding to FIG. 5B in the first modification example. As illustrated in FIG. 8A and FIG. 8B, in the first modification example, a thrust groove 146 has a substantially arc shape (one example of a curved surface shape) as seen from the radially inner side. A radial groove 142 has a substantially arc shape as seen in the axial direction.

Moreover, similarly to the above-mentioned embodiment, the thrust groove 146 and the radial groove 142 extend to the chamfered portion 40a. The thrust groove 146 and the radial groove 142 continue at the chamfered portion 40a. The width Lc of the radial groove 142 in the rotation direction is smaller than the maximum width Lb of the thrust groove 146 in the rotation direction.

Figure 9A:
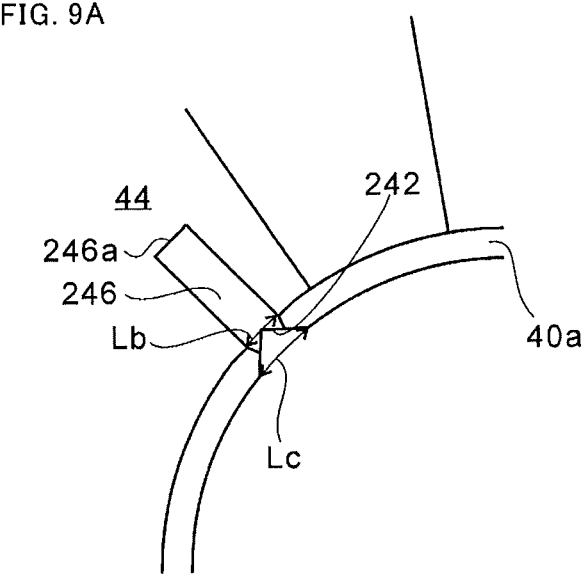
FIG. 9A is a view for illustrating a part corresponding to FIG. 5A in a second modification example.
Figure 9B:
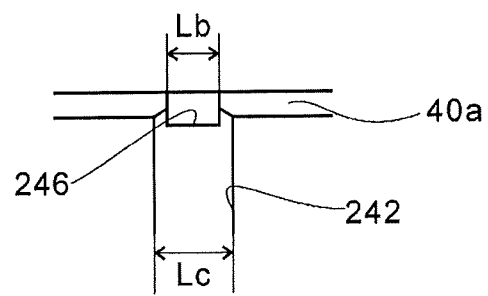
FIG. 9B is a view for illustrating a part corresponding to FIG. 5B in the second modification example.

FIG. 9A is a view for illustrating a part corresponding to FIG. 5A in a second modification example. FIG. 9B is a view for illustrating a part corresponding to FIG. 5B in the second modification example. As illustrated in FIG. 9A and FIG. 9B, in the second modification example, a thrust groove 246 has a substantially quadrangular shape as seen from the radially inner side. The thrust groove 246 has a substantially constant depth regardless of a position in the rotation direction. Moreover, the depth of the thrust groove 246 becomes smaller toward the radially outer side. The thrust groove 246 is flush with the tapered portion 44 at the end portion on the radially outer side.

Moreover, similarly to the above-mentioned embodiment, the thrust groove 246 and a radial groove 242 extend to the chamfered portion 40a. A thrust groove 246 and the radial groove 242 continue at the chamfered portion 40a. However, the width Lc of the radial groove 242 in the rotation direction is larger than the maximum width Lb of the thrust groove 246 in the rotation direction. As described above, the width Lc of the radial groove 242 in the rotation direction may be larger than the maximum width Lb of the thrust groove 246 in the rotation direction. Moreover, the width Lc of the radial groove 242 in the rotation direction may be equal to the maximum width Lb of the thrust groove 246 in the rotation direction.

As described above, description has been made of the embodiment with reference to the attached drawings. However, as a matter of course, each configuration is not limited to the above-mentioned embodiment. It is apparent that a person skilled in the art could have easily been conceived of various examples of changes and corrections within the scope of claims, and it is to be understood that, as a matter of course, those changes and corrections fall within the technical scope.

For example, in the above-mentioned embodiment and modification examples, description is made of the case in which the thrust groove 46, 146, 246 is located on the backward side in the rotation direction with respect to the width center M of the tapered portion 44 in the rotation direction. In this case, an area of the tapered portion 44 contributing to the wedge effect increases. Therefore, the oil film pressure is likely to increase. However, the thrust groove 46, 146, 246 may be located at the width center M. Moreover, the thrust groove 46, 146, 246 may be located on the forward side in the rotation direction with respect to the width center M.

Moreover, in the above-mentioned embodiment and modification examples, description is made of the case in which the distance La in the rotation direction between the land portion 43 on the backward side in the rotation direction with respect to the tapered portion 44 and the thrust groove 46, 146, 246 is smaller than the width of the thrust groove 46, 146, 246 in the rotation direction. In this case, an area of the tapered portion 44 contributing to the wedge effect increases. Therefore, the oil film pressure is more likely to increase. However, the distance La may be equal to the width of the thrust groove 46, 146, 246 in the rotation direction. Moreover, the distance La may be larger than the width of the thrust groove 46, 146, 246 in the rotation direction.

Moreover, in the above-mentioned embodiment and first modification example, description is made of the case in which the thrust groove 46, 146 has a tapered shape toward the radially outer side. In this case, the lubricating oil is likely to flow from the thrust groove 46, 146 to the inclined surface 44d of the tapered portion 44. However, it is not always required that the thrust groove 46, 146 have the tapered shape toward the radially outer side. For example, as in the above-mentioned second modification example, regardless of the position in the radial direction, the width of the thrust groove 246 in the rotation direction may be substantially constant. Moreover, the width of the thrust groove in the rotation direction may be increased toward the radially outer side.

Moreover, in the above-mentioned embodiment, description is made of the case in which the thrust groove 46 has the substantially triangular shape as seen from the radially inner side. Description is made of the case in which the radial groove 42 has the substantially triangular shape as seen in the axial direction. In this case, the thrust groove 46 and the radial groove 42 may be formed by machining through use of the same tool. Therefore, the number of steps of replacing tools is reduced. Workability improves. The above-mentioned first modification example also has the same effect.

Moreover, the shape of the thrust groove 46, 146, 246 is not limited to those given in the above-mentioned embodiment and modification examples. For example, the thrust groove 46, 146, 246 may have a trapezoidal shape as seen from the radially inner side. That is, a bottom surface may be formed in the thrust groove 46.

Moreover, in the above-mentioned embodiment and first modification example, description is made of the case in which the width Lc of the radial groove 42, 142 in the rotation direction is smaller than the maximum width Lb of the thrust groove 46, 146 in the rotation direction. In this case, the lubricating oil is likely to flow from the radial groove 42, 142 to the thrust groove 46, 146.

Moreover, in the above-mentioned embodiment and modification examples, description is made of the case in which the thrust bearing surfaces 40 and 41 are formed on the semi-floating bearing 7. However, in addition to the semi-floating bearing 7, a thrust bearing may be provided. A thrust bearing surface may be formed on the thrust bearing. In this case, in place of the semi-floating bearing 7, there may be provided another radial bearing such as a full-floating bearing or a rolling bearing. That is, in the above-mentioned embodiment, the thrust bearing surfaces and the radial bearing surfaces are formed on the same member.

However, the thrust bearing surface and the radial bearing surface may be formed on different members, respectively.

In the above-mentioned embodiment and modification examples, description is made of the case in which the oil hole 36 is formed between two of the radial bearing surfaces 33 and 34 in the main body portion 30 of the semi-floating bearing 7. However, an oil hole opened in the radial bearing surface 33 and an oil hole opened in the radial bearing surface 34 may be formed. In this case, for example, the oil holes are opened to the radial grooves 42 in the radial bearing surfaces 33 and 34. Moreover, the oil passage 2c may be branched out. The oil passage 2c that is branched out may be opposed to each of two of the damper portions 38 and 39. The oil passage 2c that is branched out may be formed so as to be opened to the inner peripheral surface 2f of the bearing hole 2b.

INDUSTRIAL APPLICABILITY

The present disclosure can be used for a bearing structure having land portions and tapered portions on a thrust bearing surface, and a turbocharger including the bearing structure.

What is claimed is:

1. A bearing structure, comprising:
   a thrust bearing surface having a through hole for allowing a shaft to be inserted therethrough;
   a plurality of land portions, which are formed on the thrust bearing surface, and are separated apart from each other in a rotation direction of the shaft;
   a tapered portion, which is formed between a first land portion and a second land portion of the plurality of land portions on the thrust bearing surface, the first land portion being forward of the second land portion in the rotation direction, the tapered portion having a projection height in an insertion direction of the shaft which becomes higher from the second land portion toward the first land portion in the rotation direction;
   a thrust groove, which is formed in the tapered portion, and extends from the through hole to a radially inner side of an outer peripheral end of the tapered portion;
   a radial bearing surface, which is formed on an inner peripheral surface of the through hole; and
   a radial groove, which is formed in the radial bearing surface so as to continue from the thrust groove, and has a width in the rotation direction smaller than a maximum width of the thrust groove in the rotation direction.

2. The bearing structure according to claim 1, wherein the thrust groove is located on a backward side in the rotation direction with respect to a width center of the tapered portion in the rotation direction.

3. The bearing structure according to claim 2, wherein a distance in the rotation direction between the land portion on the backward side in the rotation direction with respect to the tapered portion and the thrust groove is smaller than a width of the thrust groove in the rotation direction.

4. The bearing structure according to claim 3, wherein the thrust groove has tapered a shape toward a radially outer side.

5. The bearing structure according to claim 2, wherein the thrust groove has a tapered shape toward a radially outer side.

6. The A bearing structure according to claim 1, wherein the thrust groove has a tapered shape toward a radially outer side.

7. A turbocharger comprising the bearing structure of claim 1.

* * * * *